United States Patent [19]
Olsen et al.

[11] 3,848,081
[45] Nov. 12, 1974

[54] HOLLOW HIGH-VOLTAGE ELECTRIC INSULATOR

[75] Inventors: Willi Olsen; Klaus Schlosser, both of Berlin, Germany

[73] Assignee: Siemens Aktiengesellschaft, Muchen, Germany

[22] Filed: Nov. 19, 1973

[21] Appl. No.: 416,797

Related U.S. Application Data

[63] Continuation of Ser. No. 279,386, Aug. 10, 1972, abandoned.

[30] Foreign Application Priority Data
Aug. 19, 1971 Germany............................ 2142119

[52] U.S. Cl................................. 174/209, 174/212
[51] Int. Cl. ............................................ H01b 17/14
[58] Field of Search.............. 174/18, 30, 91, 138 R, 174/142, 152 R, 153 R, 167, 177, 178, 209, 212; 200/144 B, 155 R, 168 G

[56] References Cited
UNITED STATES PATENTS

| | | | |
|---|---|---|---|
| 1,786,600 | 12/1930 | Coates............................ | 174/142 X |
| 2,334,901 | 11/1943 | Bullerjahn................ | 200/168 G UX |
| 2,420,514 | 5/1947 | Bachman .................... | 174/138 R X |

FOREIGN PATENTS OR APPLICATIONS

| | | | |
|---|---|---|---|
| 1,271,818 | 8/1961 | France............................ | 174/152 R |
| 258,802 | 4/1913 | Germany............................ | 174/142 |

*Primary Examiner*—Laramie E. Askin
*Attorney, Agent, or Firm*—Kenyon & Kenyon Reilly Carr & Chapin

[57] ABSTRACT

A hollow high-voltage electric insulator includes a shell made of electrically insulating material and which is symmetrical about its axis and formed by a wall having a thickness that is small as compared to the shell's cross-sectional extent. This shell is formed with two sections of substantially different cross-sectional extents with the section having the smaller of these extents partially projecting into the other of the two sections for a portion of the latters' length and by a reversely curving wall portion radially connecting therewith. The shell's wall thickness is substantially the same throughout including the two sections and the portion of the shell which interconnects these two sections. Both sections may be substantially cylindrical. The insulator may be used to either support or drive an electrically conductive member carrying a high-voltage electric current.

5 Claims, 1 Drawing Figure

PATENTED NOV 12 1974 3,848,081
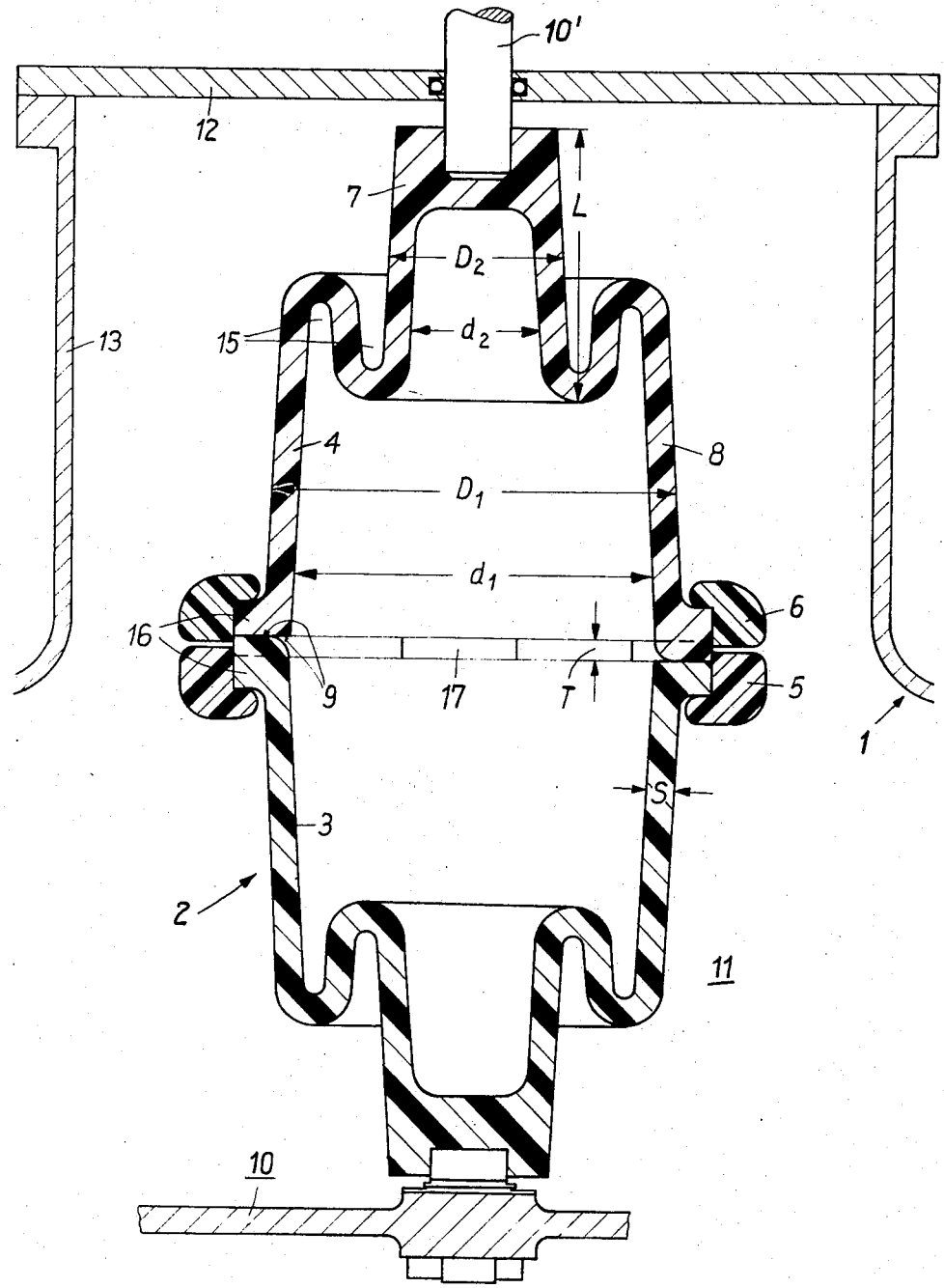

HOLLOW HIGH-VOLTAGE ELECTRIC INSULATOR

This is a continuation, of application Ser. No. 279,386 filed Aug. 10, 1972, now abandoned.

BACKGROUND OF THE INVENTION

This invention relates to high-voltage electric insulators of the type used to support or operate an electrically conductive member carrying high-voltage electric currents. For example, metal-clad switchgear may require the use of an insulator for supporting or operating the moving element of a disconnect switch within an electrically grounded metal housing. When the switch element is carrying currents having high voltages, the insulator must function both as a mechanical interconnection and electrically to adequately insulate the switch element from the housing.

DESCRIPTION OF THE PRIOR ART

Heretofore such insulators have been so-called solid-core insulators because, inherent to their design, only their exteriors need to be considered concerning leakage and arcing distances and the like. However, solid core insulators in the larger sizes involve heavy weights and manufacturing difficulties, and, or course, require a large amount of insulating material in their manufacture, making it impractical for them to be made from certain insulating materials which, although mechanically and electrically preferable, are too expensive.

With the above in mind, a prior art development was tp provide a hollow high-voltage electric insulator with a shell made of electrically insulating material and which was symmetrical about its axis and formed by a wall having a thickness that was small as compared to the shell's cross-sectional extent. With such an insulator, being hollow, a saving is effected in the amount of insulating material that must be used for making the insulator; and a hollow insulator is, or course, of lighter weight than a solid-core insulator. Such known hollow insulators are cylindrical or slightly conical shells made from insulating material, the interiors of which may be provided with a gas filling or partitions. Even so, such hollow insulators are subject to internal arcing or flashovers which lead to a breakdown of their small shell thickness. For this and other reasons hollow insulators have been avoided as much as possible and have been used only where solid-core insulators would lead to intolerably large weight and manufacturing difficulties because of large dimensions.

SUMMARY OF THE INVENTION

One of the objects of the present invention is to provide an improvement on such a hollow high-voltage electric insulator by providing a configuration which reduces or eliminates internal leakage, arcing and breakdown of its shell when appropriately designed with regard to the high voltages involved.

Another object is to provide such a hollow insulator particularly adapted for use in metal-clad switchgear applications using a compressed-gas dielectric as insulation surrounding high-voltage elements.

With these objects in mind, a hollow high-voltage electric insulator constructed according to the present invention is made from suitable insulation material in the form of a shell which is symmetrical about its axis and is formed by a wall having a thickness that is small as compared to the shell's cross-sectional extent; that is to say, the wall has a thickness that is only a fraction of the shell's diameter. This shell is formed with two sections of substantially different cross-sectional extents or diameters, the section having the smaller of these extents partially projectig into the other of the two sections for a portion of the latter's length and radially connecting therewith. The portion of the shell's wall which interconnects the two sections reversely curves smoothly without sharp corners and extends from the inner end of the smaller section to the adjacent end of the larger section. The shell's wall thickness is substantially the same throughout as to all of the shell's parts, and preferably both sections are substantially cylindrical.

As contrasted to the plain cylindrical or slightly conical shell of a prior art hollow insulator, this new insulator, because of the smaller diameter section projecting into the larger diameter section, although having a relatively short overall axial length, provides a long electrical leakage path and a long breakdown distance through the solid insulation of the shell's wall. Furthermore, when the insulator is used in a metal-clad switchgear application involving compressed-gas insulation, the gas normally having a higher dielectric constant than that of the insulation material of the insulator, the electrostatic field in this gas insulation is reduced to substantially harmless values. The stress in the gas surrounding the insulator can be smaller than in the case of solid insulators of equal length and weight. The new insulator has the advantage of permitting light-weight designs and appreciable savings in the insulating material from which the insulator is made, this saving making it practical to make the isulators of the present invention of higher quality insulating material than in the case of solid insulators, without excessive manufacturing cost. For example, the more expensive leak-proof casting resins can be used for this purpose as contrasted to the more common porcelain.

Although the hollow space inside of an insulator made according to the present invention theoretically provides space for arcing or flashovers, extensive tests and accurate observations show that such trouble can be prevented completely with reasonable designing, and when the insulator is used in connection with compressed-gas insulation surrounding the insulator, arcing or flashovers are of no significance at all. This is due not only to the absence of moisture in such insulations, but is mainly due to the dielectrically favorable form of the new insulator. In any event, the hollow space formed by an insulator of the present invention can be closed off against dirt and moisture in any known manner, but preferably by joining two of the insulator shells together at the end faces or edges of the sections of larger cross-sectional extents or diameters.

In practicing the invention, the two previously mentioned sections are preferably substantially cylindrical sections and it is advisable to make their diameter ratio 2:1 so that the space between the adjacent ends of the two sections and which must be interjoined by the reversely curving shell wall, is large enough to permit this interconnecting portion to be spread apart enough to provide space spans of sufficient extents so that a dielectric strength sufficient for the expected stresses exist without question in the region of the section of smaller diameter as well as elsewhere.

It is advantageous if the section of smaller diameter projects by at least one half of its length into the section of larger diameter because this lengthens the leakage path as compared to a plain cylindrical hollow insulator of the same length as the new insulator. Further lengthening of the leakage path can be obtained by using more than two sections; or in other words, a series, with each section of smaller diameter projecting into the next section of larger diameter.

This new insulator can be equipped with the usual fittings, for example, with cemented-on or adhesively secured metal fittings, such as bushings and the like. The outer end of the smaller diameter section may be a closed end formed for connection with a suitable fitting and the outer end of the section of larger diameter may be made with a mounting flange which extends radially, usually outwardly, so as to be engaged by clamping rings or the like. If two of the new insulators are combined with such outwardly extending flanges together, clamping rings of insulating material can provide a stable construction with a favorable, uniform distribution of the acting forces and without impairment of the electric field. Such a flange can be formed as an integral part of the shell wall and having a thickness which is the same as that of the wall. The new insulator has a relatively large diameter as compared to a solid-wall insulator, but the described flange can extend inwardly, if desired, so as not to further increase the outside diameter by the extent of the flange.

As previously indicated, two of the new insulator bodies may be joined together to form an insulator which is, in effect, of double length. The insulator shells with the two sections are easy to handle from a manufacturing point of view. When the two are joined together by means of insulating material, such as clamps made of suitable solid insulation, the composite construction has a dielectric strength practically as high as if the insulator was made as a one-piece or integral construction. In extreme instances an intermediate cylindrical construction of insulating material may be interposed between the two shells to achieve extra length with little expense. When the composite insulator construction must transmit torque, such as in the case of operating a rotary high-voltage switch element in a metal-clad switchgear application, the flanges of the two sections may be castellated to provide symmetrically disposed projections and depressions which interfit and provide for the more effective transmission of torque, particularly large torques. It has previously been indicated that the new isulator can be manufactured advantageously through the use of casting resins. In this case a one-piece outside mold may be used which leaves no seams on the surface of the insulator extending in the longitudinal direction. When made by casting, the insulator sections may be slightly conical, by about 3° to 5° for example, as contrasted to being true cylinders, this facilitating separation of the cast bodies from the mold.

DESCRIPTION OF THE DRAWING

The single FIGURE of the drawing, in longitudinal cross-section, shows to some extent schematically, the new insulator as it might be used in a metal-clad switchgear application to operate a rotary disconnect switch element operating at a high voltage such as in the area of 220 kv.

DETAILED DESCRIPTION OF THE DRAWING

Having further reference to the drawing, the partially shown electrically grounded metal housing 1 of the metal-clad switchgear installation encloses all of the high-voltage carrying parts. As a gas insulation, this housing contains a compressed gas dielectric such as sulfur hexafluoride under a pressure of 2.5 kg/cm² abs.

The insulator of the present invention is shown as a drive insulator 2 for the rotative element 10 of a disconnect switch (not otherwise shown) inside of the switchgear housing 1, the latter enclosing the gas insulation in the space 11. A metal operating shaft 10' is journaled in the grounded cover 12 of the housing 1 for external application of torque to rotate the switching element 10 and is fixed, as by cement, in the adjacent closed end of the insulator 2, and the function of the drive insulator 2 is to apply the torque to this switching element and possibly to support the latter. This cover 12 is applied to an extension 13 of the housing 1.

The insulator 2 is shown as comprising two of the shells fastened together as previously suggested, by means of flange clamps 5 and 6 made of isulating material, the clamping force being effected by fastening elements also made of an insulating or dielectric material (not shown). Both shells are identical to each other and are rotatively symmetrical; in other words, they are symmetrical about their common axis, are mutually concentric, and both have cylindrical shapes other than for being very slightly conical, such as conical to an extent of from a 3° to 5° angularity, relative to their axes, to permit them to be more easily removed from a mold and core when made by casting.

As to each shell, its wall thickness is a fraction of its inside diameter, specifically about 1/13, and possibly less, of the larger inside diameter $d_1$ and about 1/5, or possibly less, of the smaller inside diameter $d_2$ of the larger and smaller sections respectively. The outside diameter $D_2$ of the smaller section 7 is less than half the inside diameter $d_1$ of the larger section 8, the latter's outside diameter $D_1$ being fixed by the wall thickness of the sections. The portion of the wall that radially interconnects the two sections curves from the inner end of the smaller section and extends in an axial direction until reversely curving and joining with the adjacent end of the larger section, this interconnection portion in cross-section having an S-curve configuration. Therefore, where the ends of the two sections overlap, the wall thickness S, which uniformly exists throughout the shell, is multiplied by about three times throughout the space between the outside diameter $D_2$ of the smaller section 7 and the inside diameter $d_1$ of the larger section 8. Therefore, even in the places where the smaller insulator section 7 re-enters the larger insulator section 8 the gas distances 15 are so large that no danger of a glow discharge, or corona, exists. The smaller insulator section 7, which may be only slightly shorter than the larger insulator section 8, protrudes into the latter by only one-half of the length L of the smaller insulator section 7.

The two shells 3 and 4 are placed against each other with their end faces 9 intercontacting or abutting. Each shell is shown with a radially outwardly extending flange 16 upon which the flange clamps 5 and 6 engage. Instead of a mechanical clamping connection, or in addition to it, the end faces 9 may be cemented together, preferably with synthetic resin. The flanges may extend inward when cementing is used. Because of the compressed gas insulation existing in the space 11 in the present instance, it may be advantageous to leave an opening to the interior of the composite insulator so that this gas provides a higher internal dielectric strength for the interior. Such an opening is not shown, but if the two parts are not cemented together, it could be inherent by leakage between the two mechanically interconnected shells.

The flange 16 radially projects from the outer or open end of each shell by slightly more than the wall thickness S of each of the shells. These flanged ends of the two shells are castellated, each respectively having symmetrically arranged cut-outs or recesses 17 of a depth T so that the two insulator shells engage each other by an intermeshing arrangement uniformly distributed over their circumferences. This permits the transmission of large torques through the new insulator from the shaft 10' to the switching element 10. At the same time the two housing shells can be cast by means of a simple, one-piece outer mold and a one-piece inner core, leaving no seams, the material used preferably being one of the more expensive leakproof casting resins the economic use of which is made permissible by the smaller amount of material required in the case of the present invention as compared to a solid-core insulator. It is for this casting reason that the two sections of each shell are made slightly conical as previously described, whereby to permit easy lifting or moving of the cast bodies from the mold and core.

The outer ends of the sections 7 are closed and formed to connect with the parts 10 and 10' as by cementing or the like.

With the new insulator described hereinabove, a long internal and external leakage path is obtained and the breakdown resistance path through the solid insulating material is also very long. It is apparent that its dielectric constant may be different from that of the gaseous dielectric surrounding the insulator in the case of this illustrated example. In such an instance a very favorable field distribution throughout the gas insulating medium is obtained.

What is claimed is:

1. A hollow high-voltage electric insulator comprising a pair of shells made of electrically insulating material, each shell being symmetrical about its axis and formed by a wall having a thickness that is small as compared to the shell's cross-sectional extent; wherein the improvement comprises each shell being formed with two sections of substantially different cross-sectional extents with the section having the smaller of said extents partially projecting into the other of said sections for a portion of the latter's length and radially connecting therewith, the outer end of said section having the smaller cross-sectional extent being closed and formed for permitting connection therewith and the other of said sections on its outer end having a radially extending peripheral flange for permitting connection therewith, said pair of shells being interconnected with their said flanges together.

2. A hollow high-voltage electric insulator comprising a pair of shells made of electrically insulating material, each shell being symmetrical about its axis and formed by a wall having a thickness that is small as compared to the shell's cross-sectional extent; wherein the improvement comprises each shell being formed with two sections of substantially different cross-sectional extents with the section having the smaller of said extents partially projecting into the other of said sections for a portion of the latter's length and radially connecting therewith, said sections being substantially cylindrical and concentric and having a diameter ratio of substantially 2:1, said section of smaller cross-sectional extent projecting into the other of said sections for about one-half the length of the former, and the outer end of said section having the smaller cross-sectional extent being closed and formed for permitting connection therewith, and the other of said sections on its outer end having a radially extending peripheral flange for permitting connection therewith, said pair of shells being positioned with their said flanges together and having means fastening said flanges together, which means consists of electric insulating material.

3. The insulator of claim 2 in which said flanges respectively have recesses and projections which interfit to interlock said shells against relative rotation.

4. A hollow high-voltage electric insulator comprising a pair of shells made of electrically insulating material, each shell being symmetrical about its axis and formed by a wall having a thickness that is small as compared to the shell's cross-sectional extent; wherein the improvement comprises each shell being formed with two sections of substantially different cross-sectional extents with the section having the smaller of said extents partially projecting into the other of said sections for a portion of the latter's length and radially connecting therewith, the outer end of said section having the smaller cross-sectional extent being closed and formed for permitting connection therewith and the other of said sections on its outer end having a peripheral end face for permitting connection therewith, said pair of shells being interconnected with their said end faces together.

5. The insulator of claim 4 in which said end faces are cemented together.

* * * * *